United States Patent
Tazzari et al.

(10) Patent No.: US 8,612,734 B2
(45) Date of Patent: Dec. 17, 2013

(54) METHOD AND APPARATUS FOR REPROGRAMMING APPLICATIONS IN EMBEDDED DEVICES

(75) Inventors: Davide Tazzari, Arezzo (IT); Filippo Vernia, La Spezia (IT)

(73) Assignee: Power-One Italy S.p.A., Terranuova Bracciolini (IT)

( * ) Notice: Subject to any disclaimer, the term of this patent is extended or adjusted under 35 U.S.C. 154(b) by 742 days.

(21) Appl. No.: 12/754,380

(22) Filed: Apr. 5, 2010

(65) Prior Publication Data

US 2010/0257345 A1    Oct. 7, 2010

(51) Int. Cl.
*G06F 9/00* (2006.01)
*G06F 15/177* (2006.01)

(52) U.S. Cl.
USPC ............... 713/2; 713/1; 713/100; 707/697; 717/168; 717/176; 717/178

(58) Field of Classification Search
USPC ............... 713/1, 2, 100; 717/168, 176, 178; 707/697
See application file for complete search history.

(56) References Cited

U.S. PATENT DOCUMENTS

| | | | |
|---|---|---|---|
| 6,925,365 B2 | 8/2005 | Luitje et al. | |
| 7,334,117 B2 * | 2/2008 | Wilson et al. | 713/1 |
| 8,065,510 B2 * | 11/2011 | Hanes | 713/2 |
| 8,196,130 B2 * | 6/2012 | Chen et al. | 717/168 |
| 8,320,302 B2 * | 11/2012 | Richeson et al. | 370/328 |
| 2003/0031235 A1 * | 2/2003 | Kim et al. | 375/147 |
| 2003/0229752 A1 | 12/2003 | Venkiteswaran | |
| 2010/0050168 A1 * | 2/2010 | Sharonov | 717/173 |
| 2011/0040415 A1 * | 2/2011 | Nickerson et al. | 700/284 |

FOREIGN PATENT DOCUMENTS

EP    1701262    9/2006
WO    0158146    8/2001

* cited by examiner

*Primary Examiner* — Jaweed A Abbaszadeh
(74) *Attorney, Agent, or Firm* — Waddey Patterson; Mark J. Patterson

(57) ABSTRACT

A method for uploading and storing application code in a re-writable, non-volatile memory of an electronic device is carried out by means of a bootloader. The bootloader receives the application code transmitted by a master unit through a communication channel, writes at least one portion of the application code to a portion of the non-volatile memory, and validates the at least one portion of the application code by means of the bootloader.

18 Claims, 5 Drawing Sheets

METHOD AND APPARATUS FOR REPROGRAMMING APPLICATIONS IN EMBEDDED DEVICES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: PCT/IT2007/000692, filed Oct. 3, 2007.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to electronic devices, in particular electronic embedded devices, which may include a microcontroller and a nonvolatile memory storing software or application code, i.e. firmware. More particularly, the present invention relates to methods for programming or re-programming firmware in electronic embedded devices, such as power supply systems, controllers, sensors and other devices.

In the field of producing, programming and installing embedded electronic devices, it is well known that, even after a test or production period, a need can arise to re-program the devices to update them to new functionalities or because of the presence of faults or failures not previously detected in the code.

The conventional re-programming solution is to physically remove the board and to update the firmware by means of a conventional external programming device.

A bootloader is a software layer which manages the basic functions of the device to update the application code without using a programmer and without touching the device itself. Typically, this operation is performed by using a communication channel, e.g. RS232, RS485, 12CBus, SPI, or USB. This procedure is carried out remotely. Furthermore, it is necessary to consider that an embedded environment is typically an environment with few resources, and that the bootloader must necessarily ha code.

In an embedded environment (e.g., power supply systems, controllers, and sensors) this software layer is used for reprogramming the firmware with no need to shut down the machine, to remove the board from its support, or to disconnect it from one or more parts of the device. In this manner, savings can be obtained in a variety of ways, including the following:

1. There is no need for the customer to return the devices to be reprogrammed.
2. The customer himself can update the firmware received through any means, even through the same management program for managing the device, i.e. "friendly" interface produced and tested ad hoc by the manufacturing company.
3. The customer does not incur service interruptions due to the "traditional" management of reprogramming.
4. The manufacturing company can provide stronger support to the customer without logistics and management costs of reprogramming, by making the new firmware available for the customer through whatever means (e.g. via electronic mail).

European Patent Publication EP-A-1,701,262 describes a method for re-programming a device, in which a memory is present, comprising a sector storing a bootloader and one or more sectors storing the application programs. This publication relates in particular to a method that allows optimal exploitation of the available memory without leaving unused spaces but rather guaranteeing the integrity of the bootloader during the reprogramming phase.

U.S. Pat. No. 6,925,365 describes a system for updating applications by means of a flashloader in a vehicle control unit for controlling electronic devices. The described system provides for the automatic update from an existing version of application code to a new version by using the flashloader.

One of the problems that can occur in conventional updating or re-programming procedures is management of the critical operations, which can result in a malfunction of the device. These critical operations can include: management of the communication channel; receipt of the new firmware fragmented into a plurality of messages; power outage during the procedure; corruption of the new firmware (during transmission, during saving, or corruption of a memory cell, because of external factors due to damage to the device); minimal management of the device in the case of absence of the application code so as to avoid device damage; and certainty that the application code to be executed is the code "desired" by the person who updated the device.

Data corruption or loss during the reprogramming phase controlled by the bootloader can result in a non-functioning device. Errors in data transmission, reading or writing, an accidental power outage, or other external factors may lead to the corruption of the application code and, therefore, to a failure in the device.

BRIEF SUMMARY OF THE INVENTION

In particular, the present invention relates to re-programming methods for re-programming application code stored in a memory, for example a memory of an embedded device, by means of a bootloader, which allows avoiding or limiting errors or critical situations of the type described above.

According to one aspect, the invention provides a method for uploading and storing application code in a rewritable non-volatile memory of an electronic device by means of a bootloader. The method may include receiving the application code transmitted by a master unit through a communication channel, writing the application code in a portion of the non-volatile memory, and validating at least a portion of the application code by means of the bootloader.

In general, the code or a portion thereof, is validated by computing, through the bootloader, a checksum (for instance, CRC 16 or other validation algorithm), which is then transmitted back to the master, which in turn verifies whether the checksum matches with a checksum previously calculated on the application code or on the corresponding portion thereof before the transmission from the master to the bootloader. If the two checksums match, the master enables the bootloader to execute a subsequent operation. If the two checksums do not match, the master can repeat the transmission of the same portion of application code, or of the whole application code, or, in case, it can abort the procedure and signal the anomaly.

Further advantageous characteristics and embodiments of the method according to the invention are set forth in the appended claims and will be further described hereunder, with reference to non-limiting practical embodiments of the invention, shown in the accompanying drawings.

DETAILED DESCRIPTION OF THE INVENTION

Figure 1:
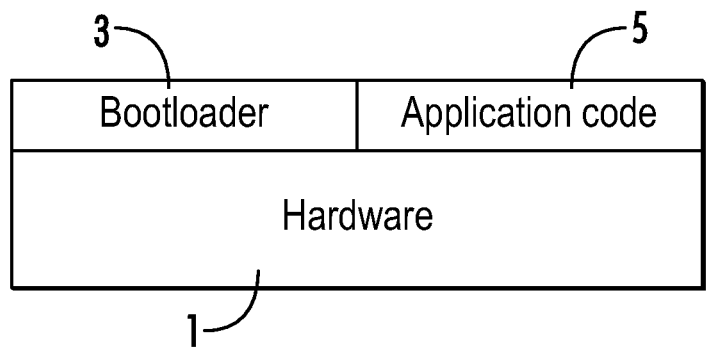
FIG. 1 is a functional block diagram of a combination hardware and software system in accordance with the present invention.

Referring to FIG. 1, in principle, a system on which the invention can be implemented can be represented schematically as a hardware block 1 which interacts with bootloader 3 and application code 5, which constitute, as a whole, the firmware installed on the device.

According to a first approach, both the bootloader 3 and the application code 5 can be provided as two separate firmware installations, each forming a unit by itself. Each firmware exists as an alternative to the other. Therefore, to operate, both the bootloader 3 and the application code 5 should have at least the basic functionalities for managing the available hardware 1, including for example:

1. I/O initialization, to keep the hardware under control and to avoid malfunctions;
2. Management of the communication channels so that the bootloader can receive new application code to allow remote control; and
3. Generic functions not depending from the program per se, such as, by way of example, CRC routines, memory management routines, etc.

The bootloader 3 is firmware with reduced dimensions (512, 1024, 048 . . . bytes code and 128, 256, 512 . . . bytes RAM, depending upon the device) located in a typically protected memory portion of the microcontroller, that is in a portion of memory which can not be written without the aid of an application external device called a "programmer". This means that the bootloader 3 cannot be accidentally overwritten because of an error in the firmware. The application can instead occupy the remaining part of the device, and is located in a portion of memory of the microcontroller, which is not typically protected, that is in a portion of memory which can be written without the aid of a programmer. This is the real project and contains all the functionalities necessary for managing the device. Both the bootloader 3 and the application code 5 must be compiled in the programming environment dedicated to the microcontroller used.

Figure 2:
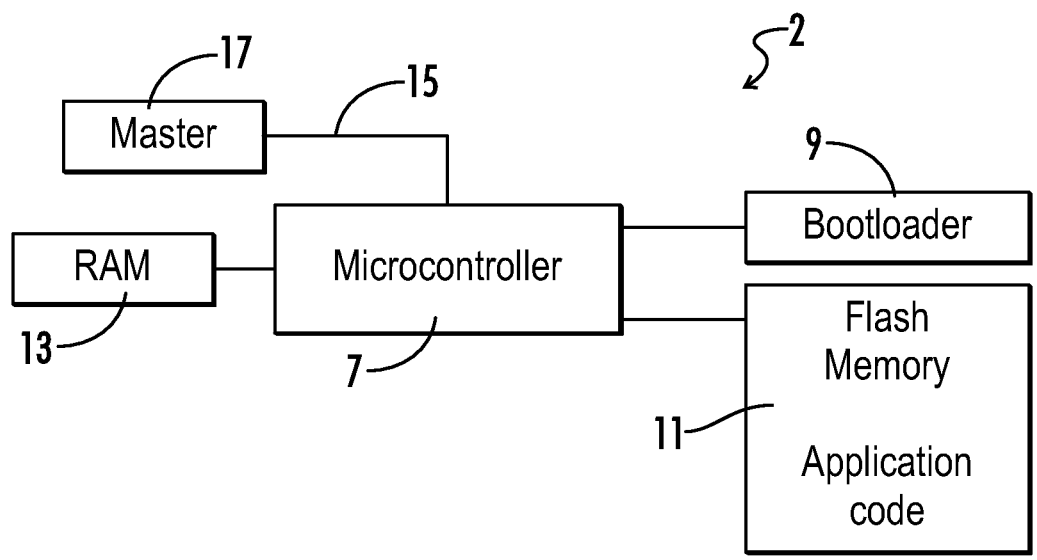
FIG. 2 is a block diagram of one embodiment of an apparatus in accordance with the present invention.

FIG. 2 schematically shows a functional block diagram of one embodiment of a device 2, including a microcontroller 7, protected memory in which the bootloader 9 resides, and flash memory 11 or other rewritable non-volatile memory (EPROM) in which the application code resides. A volatile memory (RAM) 13 and a communication channel 15 for communicating with a generic master unit 17 are coupled with the microcontroller 7, for performing the re-programming of the device. The master unit 17 can be a computer, for example a portable computer or any other embedded device.

After any reset of the device 2, due to either a shutdown, an external hardware management, or a forced reset via software, the bootloader 9 is the first firmware which takes the control of the device. The bootloader 9 performs the following functions:

1. Initializes all peripheral devices.
2. Controls whether application code is present.
3. Controls (in the manner described in greater detail below) whether the application code is valid.
4. Controls whether it was commanded to stay in boot mode and wait for new application code or if it can "jump" to the execution of the application code already present after having validated it.
5. Manages the communication channel 15 to receive commands and/or new firmware from the master 17.

Typically, when a reset of the device 2 occurs, once the bootloader 9 has performed the controls defined above and verified that it can jump to the application code already present in the non-volatile memory 11, the device 2 changes from the boot mode to the execution of the application code, under the control of the latter. At startup, the application code once again initializes all the peripheral devices and starts normal functioning.

When a user decides to externally update the application code of the device 2, it is sufficient to communicate it, so that the application code itself stores somewhere (for example external EPROM) the need for boot-mode and executes a software reset.

The operations carried out by the bootloader 9 at a new startup of the device 2 are substantially known to a person of skill in the art per se, and they will not be described in particular detail. Possible methods for re-programming the application code resident in the non-volatile memory 11 by means of the bootloader 9 will be described hereunder.

FIGS. 3A through 3I schematically show a possible method for re-programming and validating the application firmware or application code. Re-programming can be required, for instance, to update the software, to replace corrupted software, or for any other reason.

Generally, the resources of a microcontroller are extremely limited. Therefore, according to some embodiments of the invention, the new firmware is not downloaded all at once and validated before being accepted. Instead, it will be received fragmented and each fragment is stored in the zone dedicated to the application code. According to some embodiments, the application code can be subdivided into a plurality of so-called portions (called "pages"), each of which is stored in a portion of memory. Each page is transmitted as a whole, stored by the bootloader 9 in the non-volatile memory 11, and validated. In other embodiments, each page must be subdivided into parts or portions, which are stored one at a time in a buffer or temporary register to complete a single page. The single page is then stored in the non-volatile memory 11 and validated, or validated before being copied by the buffer into the non-volatile memory 11, or validated both before and after being written to the non-volatile memory 11.

A process of this type, in which each page is subdivided in code parts or fragments, is necessary, for example, in the case of a microprocessor 7 with pages of 64 or 128 bytes and an exchanged packet of 32 bytes. In this case, the writing command for writing the pages to the non-volatile memory or flash memory 11 can be subdivided into two or four commands of 32 bytes each, for example due to the limited memory available for implementing transmission/receipt of data.

This process will be described in greater detail hereunder, with reference to the schematic sequence shown in FIGS. 3A-3I.

In a first phase (FIG. 3A), the bootloader 9 receives from the master 17 through the channel 15 a first part of a generic page N of the application software, which must be written to the non-volatile memory 11. In this phase, the integrity of the message containing the first part of the $N^{th}$ page is verified by the bootloader 9 in a known manner, for example by means of a CRC (cyclic redundancy check) contained in the message itself. The validity of the message, i.e. the integrity of data received, is verified by the bootloader 9 on the basis of the transmission protocol used. Data is stored in a support buffer constituted, for example, by a portion of the RAM 13 of the device 2.

The procedure is repeated (FIGS. 3B, 3C) until the support buffer will contain all the parts, which form the $N^{th}$ page. At this point, it is possible to validate the received page; otherwise, validation can be performed after writing to the non-volatile memory 11. In the example shown in FIG. 3, validation of the page is carried out after writing to the non-volatile memory 11, in such a way as also to detect any error which may occur in transferring data from the volatile memory of the support buffer to the flash memory 11. It is also possible to perform both the validations before and after writing to the non-volatile memory 11.

Figure 3A:
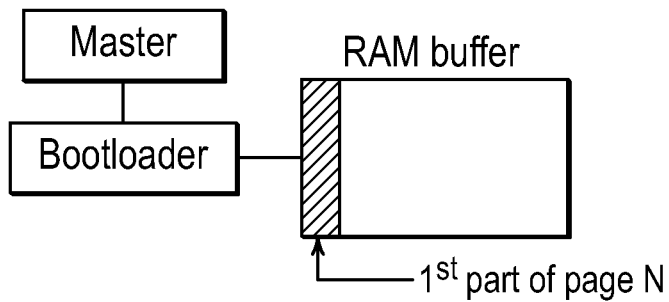
FIGS. 3A through 3I are flow charts showing a possible sequence of operations for re-writing or re-programming application code in accordance with an embodiment the present invention
Figure 3B:
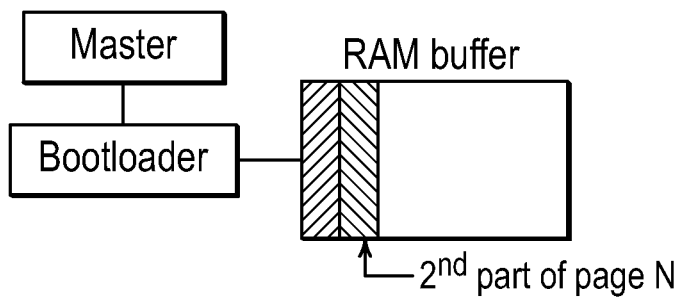
Figure 3C:
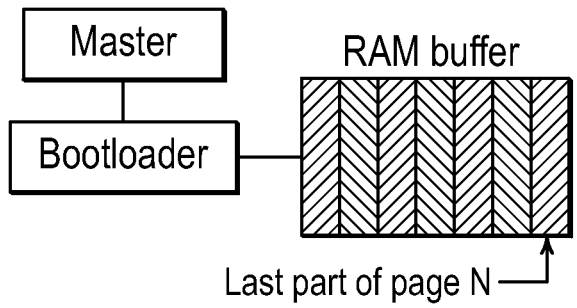
Figure 3D:
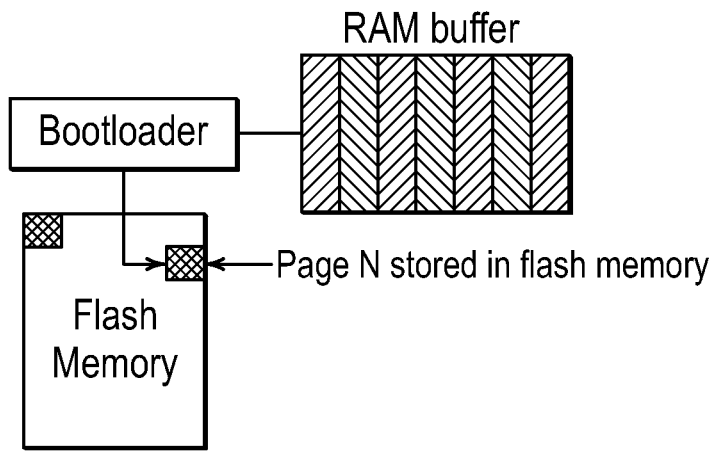
Figure 3E:
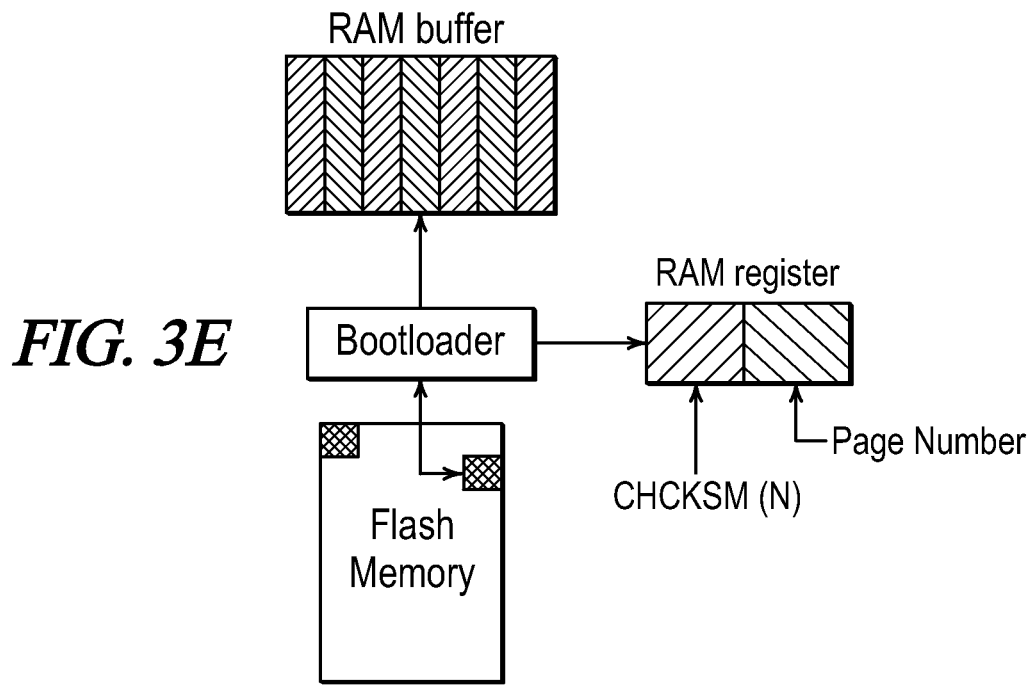

With reference to the example represented in FIGS. 3A-I, after the whole $N^{th}$ page has been written to the support buffer (FIG. 3C), the bootloader writes it to a partition of non-volatile memory (FIG. 3D).

Validation of the whole page is necessary for the following reason. The integrity of the individual messages or page parts (which has been validated by the bootloader 9 through the CRC stored in each message received during the preceding phases, FIGS. 3A-3C) does not guarantee that the $N^{th}$ page is correctly written to the flash memory 11. Furthermore, the correct receipt of the single messages containing single parts of a page does not allow confirmation of whether all the parts of the page have been effectively received.

Therefore, the following phase (FIG. 3E) provides that the bootloader 9 performs the verification or validation of the $N^{th}$ page. For this purpose, according to one possible embodiment, the bootloader 9 can read the page from the memory 11 and transmit it again to the master 17, which then performs the comparison between what was transmitted and what was received, for example by calculating a checksum of the two versions of the application code. This process is, however, long and not efficient.

According to other more efficient embodiments, validation of the page is performed by making the bootloader 9 calculate the checksum of the whole page just written. For this purpose (FIG. 3E), the content of the page can be transferred by the bootloader 9 to a volatile memory buffer and the checksum is calculated on this data. The checksum can be advisably stored in a further buffer or volatile memory register, associated with the page number (N) to which it refers, if desired.

In the following phase, the bootloader 9 transfers the checksum to the master 17 (FIG. 3F), and the latter verifies that this checksum corresponds to the checksum stored by the master 17 before the transmission of the $N^{th}$ page.

Validation of all single pages received is not sufficient to guarantee the integrity and completeness of the application code received and loaded by the bootloader 9 in the non-volatile memory 11. In fact, the checks and validations performed up to now are not able to detect, for example, a missing page. It is therefore necessary to perform a validation operation, i.e. a control operation, on the integrity and completeness of the whole application code in its entirety. For this purpose (FIG. 3G), according to some embodiments, the bootloader 9 can calculate the whole checksum on the whole application code stored in the flash memory 11. The calculated checksum is stored in a register and transmitted to the master 17. However, this process is not particularly efficient.

Figure 3F:
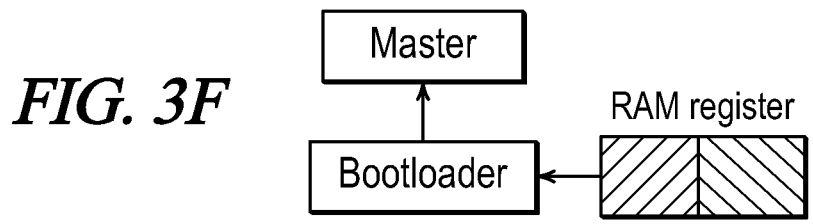
Figure 3G:
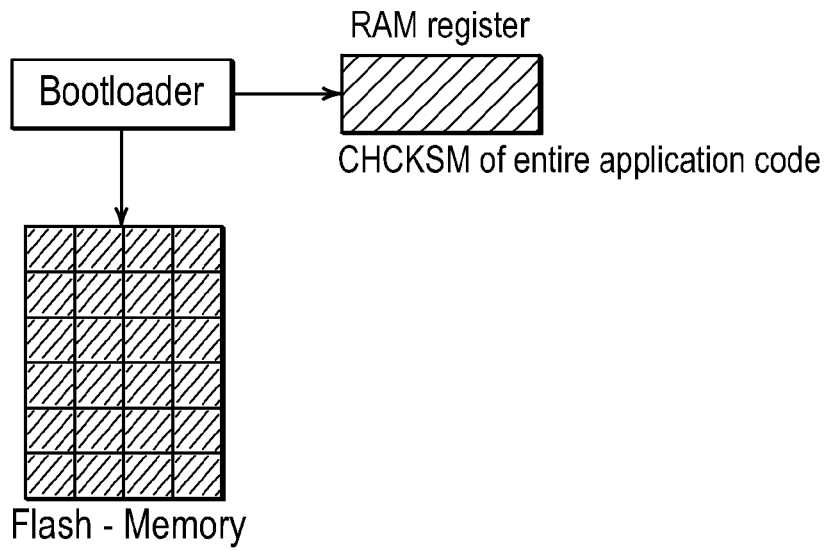
Figure 3H:
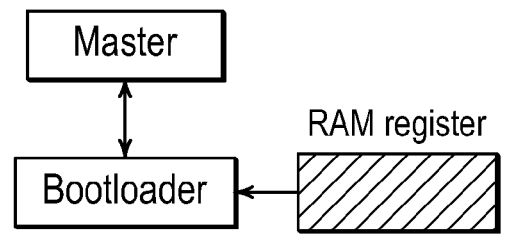
Figure 3I:
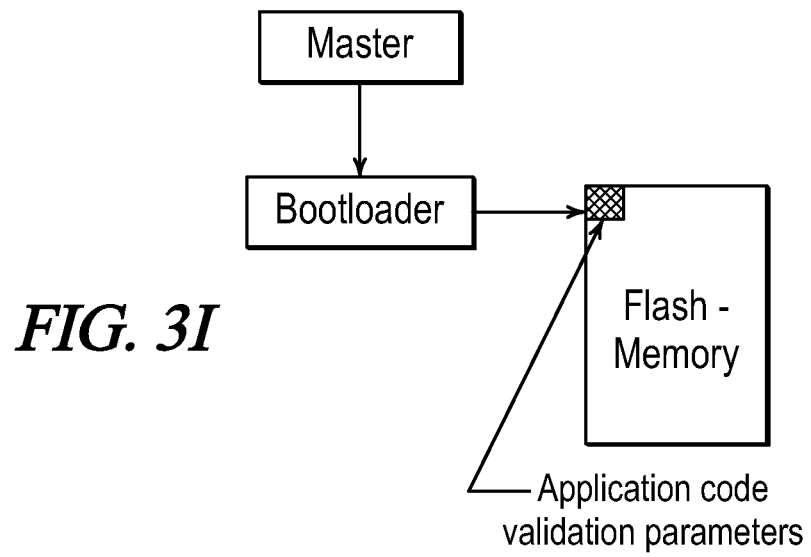

In a preferred embodiment, validation of the entire application code is performed by using the partial checksums as they are calculated on the single pages written in the flash memory 11. For this purpose, the checksum of an $N^{th}$ page stored in the volatile register as described with reference to FIG. 3F is used as a seed to generate the checksum of the following page. Therefore, the value of the checksum calculated on the last page represents the checksum of the whole application code in its entirety. This data is transmitted to the master 17 for validation. The master 17 has calculated, in a similar manner, the checksum of the application code before transmitting it, and now it can therefore compare these two values. If the transmission was successful and complete and the data has not been corrupted during the transmission, writing and reading phases, the two checksums must be equal. If this condition does not occur, the master 17 can repeat the operation again.

If the validation is successful, the master (FIG. 3I) communicates one or more additional parameters to the bootloader 9, to allow it to validate the whole application code during subsequent startups of the system, for example following a shutdown of the device 2. These parameters can include: addresses of the zones of the non-volatile memory 11 in which the firmware or application code is stored, address of the first instruction of the new firmware or application code, or complete checksum (CRC 16) of the whole application code.

At startup, the bootloader 9 reads this information and calculates the checksum of the firmware in order to verify whether the application is correct or whether it is corrupted or incomplete and, therefore, damaged. In the first case, the bootloader 9 is authorized to jump to the application code. In the second case it waits (for example, in error mode) for a new application.

In this way, it is possible to avoid errors due, for example, to a power outage during the programming phase. In fact, after having received and stored the first portion (page) of application code, the old application code resident in the memory 11 cannot be used, as it is no longer complete and coherent. At this point, if for any reason a reset occurs, the device 2 would have available an incorrect and potentially dangerous application. The bootloader 9 can detect this error situation, as at startup it performs a validation phase for validating the stored application code by calculating its checksum and comparing it with the checksum previously stored. In an anomalous situation of the type described above, the checksum is calculated on a series of instructions that are partly of the old application code and partly of the new application code. Therefore, this checksum does not match with the stored checksum.

Figure 4:
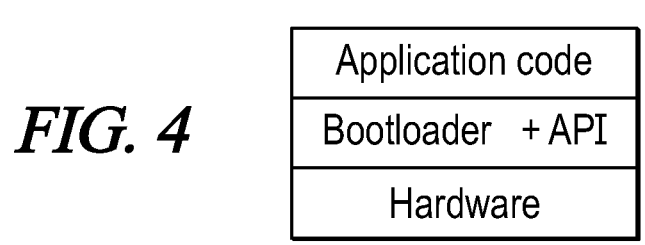
FIG. 4 is a functional block diagram of a combination hardware and software system in accordance with the present invention, showing a different software configuration.

The described validation criteria can be applied also in the presence of a different organization of the hardware/firmware (bootloader—application code) system, for example of the type shown in FIG. 4.

In this new organization, the management functions of the bootloader 9 for managing the hardware are not replicated in the application code. The application code utilizes the management functions (API=application programming interface)

already present in the bootloader 9 and that the bootloader is made available to the application code itself.

APIs are a series of basic functions to which the application can have access in order to perform its operations and which, in this way, do not have to be duplicated. By way of example, one can consider I/O initializing, interrupt functionalities, communication routines (transmitting and receiving), CRC and timing routines.

In this case, the application code cannot exist alone, but rather only with the support of the bootloader. This approach allows the application code to be reduced, eliminating all the generic and redundant parts generally duplicated, and provides a more efficient and safe application code. It is not necessary to test the basic routines every single time new application code is made available. It will only be necessary to test the advanced functionalities.

Obviously, in the case of a request for update, the device will not be reset, and the bootloader, which is—as already stated—always active, will suspend the execution of the application until further orders and until a correct and validated application will be present again.

The previous detailed description has been provided for the purposes of illustration and description. Thus, although there have been described particular embodiments of the present invention of a new and useful "Method And Apparatus For Reprogramming Applications In Embedded Devices," it is not intended that such references be construed as limitations upon the scope of this invention except as set forth in the following claims.

What is claimed is:

1. A method for uploading and storing application code in a re-writable, non-volatile memory of an electronic device by means of a bootloader, comprising the steps of:
   in a receiving step, receiving the application code transmitted by a master unit through a communication channel;
   in a writing step, writing at least one portion of the application code to a portion of the non-volatile memory;
   in a calculation step, calculating by means of the bootloader a checksum of the at least one portion of the application code;
   in a transmitting step, transmitting the checksum calculated by the bootloader to the master unit; and
   in a verification step, verifying by the master unit if the checksum calculated by the bootloader matches with an original checksum previously calculated on the at least one portion of the application code before transmission through the communication channel.

2. The method of claim 1, wherein the bootloader receives in sequence a plurality of portions of the application code, the method further comprising:
   in the calculation step, the bootloader calculates a checksum for each received portion of the application code;
   in the calculation step, the bootloader calculates a checksum for the entire application code;
   in the transmitting step, each checksum calculated by the bootloader is transmitted to the master unit; and
   in the verification step, the master unit verifies matching of each checksum calculated by the bootloader on each received portion and on the entire application code with a checksum previously calculated on the corresponding portion of the application code and on the entire application code before transmission through the communication channel.

3. The method of claim 2, wherein:
   after having successfully verified matching between the checksum calculated by the bootloader on the entire application code and the original checksum on the entire application code, the master unit sends to the bootloader at least one validation parameter for validating the application code, and the validation parameter is stored by the bootloader in a protected memory; and
   at each startup of the device, the bootloader performs a validation of the application code through the validation parameter.

4. The method of claim 1, wherein:
   after having successfully verified the matching between the checksum calculated by the bootloader and the original checksum, the master unit sends to the bootloader at least one validation parameter for validating the at least one portion of the application code, and the parameter is stored by the bootloader in a protected memory; and
   at each startup of the device, the bootloader performs a validation of the application code through the validation parameter.

5. The method of claim 1, wherein each portion of the application code is constituted by a page of the application code.

6. The method of claim 1, wherein in the receiving step, the master unit transmits each portion of application code subdivided into a series of two or more parts, sent in sequence through the channel, and recomposed by means of the bootloader in order to form the portion of the application code.

7. The method of claim 6, wherein, in the calculation step, the bootloader calculates the checksum of each single portion of application code constituted by a series of parts singularly transmitted, before receiving the series of parts forming a subsequent portion of the application code.

8. The method of claim 1, wherein
   after having written a plurality of portions of the application code to the non-volatile memory, by means of the bootloader, in the calculation step the bootloader calculates the checksum of the entire application code formed by the plurality of portions,
   in the transmitting step, the bootloader transmits the checksum to the master unit; and
   in the verification step, the master unit verifies if the checksum calculated by the bootloader matches with an original checksum previously calculated on the entire application code before transmission through the communication channel.

9. The method of claim 1, further comprising:
   (a) the receiving step further comprises sequentially receiving by the bootloader a plurality of portions of the application code, the plurality of portions constituting a page of the application code;
   (b) the writing step further comprises storing the portions of application code in a sequential manner;
   (c) the calculating step further comprises calculating a current page checksum of the page of application code as all the portions of the page have been stored;
   (d) storing the current page checksum in a register;
   (e) the transmitting step further comprises sending the current page checksum to the master unit;
   (f) the verification step further comprises verifying by the master unit of the current page checksum calculated with a corresponding original page checksum previously calculated; and
   (g) repeating steps (a)-(f) for any following pages of the application code, if the verification step confirmed matching of current page and original page checksums.

10. The method of claim 1, further comprising:
    (a) the receiving step further comprises sequentially receiving by the bootloader a sequence of parts of a current page of the application code;

(b) storing the parts of application code in a support buffer in a sequential manner;
(c) the writing step further comprises writing the content of the support buffer to the re-writable, non-volatile memory as all the parts of the current page have been stored in the support buffer;
(d) the calculating step further comprises calculating a current page checksum of the page;
(e) storing the current page checksum in a register;
(f) the transmitting step further comprises sending the current page checksum to the master unit;
(g) the verification step further comprises verifying by the master unit the calculated current page checksum;
(h) repeating steps (a)-(f) for any following pages of the application code, if the verification step confirmed the current page checksum.

11. The method of claim 1, further comprising:
(a) the receiving step further comprises receiving by the bootloader a current page of the application code;
(b) the writing step further comprises storing the current page in the re-writable, non-volatile memory;
(c) the calculating step further comprises calculating a current page checksum of the current page;
(d) storing the current page checksum in a register;
(e) the transmitting step further comprises sending the current page checksum to the master;
(f) the verification step further comprises verifying by the master unit the calculated current page checksum;
(g) repeating steps (a)-(f) for any following pages of the application code, if the verification step confirmed the current page checksum.

12. The method of claim 1, further comprising:
(a) the receiving step further comprises receiving by the bootloader a sequence of parts of a current page of the application code;
(b) storing the parts of application code in a support buffer in a sequential manner;
(c) the calculating step further comprises calculating a current page checksum of the current page and storing the current page checksum in a register, as all the parts of the current page have been stored in the support buffer;
(d) the writing step further comprises writing the content of the support buffer to the rewritable non-volatile memory;
(e) the transmitting step further comprises sending the current page checksum to the master unit;
(f) the verification step further comprises verifying by the master unit the calculated current page checksum;
(g) repeating steps (a)-(f) for any following pages of the application code, if the verification step confirmed the current page checksum.

13. The method of claim 1, wherein, in the calculating step, the bootloader calculates the checksum of the entire application code written to the re-writable, non-volatile memory and, in the transmitting step, communicates the checksum to the master unit, and, in the calculating step, the master unit compares the checksum calculated by the bootloader with a checksum calculated on the application code before transmission through the communication channel to the bootloader.

14. The method of claim 1, wherein:
the application code utilizes management functions present in the bootloader and made available by the bootloader to the application code;
the bootloader is always active; and
in case of a request for update of the application code, the bootloader suspends the execution of the application until further commands and until a correct and validated application is present again.

15. The method of claim 1, wherein the bootloader is stored in a portion of protected memory.

16. An electronic device comprising:
a microcontroller coupled to a communications channel;
a volatile memory unit coupled to the microcontroller;
a re-writable, non-volatile memory unit functionally coupled to the microcontroller and effective to store application code;
a protected, non-volatile memory unit comprising a stored bootloader functionally coupled to the microcontroller, and
the bootloader is functional to
receive the application code transmitted by a master unit through the communication channel,
write at least one portion of the application code to a portion of the non-volatile memory,
calculate a checksum for the at least one portion of the application code by means of the bootloader,
transmit the calculated checksum to a master unit via the communications channel, and
receive confirmation from the master unit that the application code is validated.

17. The electronic device of claim 16 wherein the bootloader is further functional to
receive in sequence a plurality of portions of the application code,
individually calculate a checksum for each received portion of the application code, and
transmit each calculated checksum to the master unit.

18. The electronic device of claim 17 wherein the bootloader is further functional to perform a calculation of the checksum of each single portion of application code constituted by a series of parts singularly transmitted, before receiving the series of parts forming a subsequent portion.

* * * * *